United States Patent
Uchidoi et al.

(10) Patent No.: US 7,094,324 B2
(45) Date of Patent: Aug. 22, 2006

(54) ELECTRODEPOSITION COATING METHOD USING LEAD-FREE CATIONIC ELECTRODEPOSITION COATING COMPOSITION

(75) Inventors: Satoru Uchidoi, Osaka-fu (JP); Yoshio Kojima, Nara-ken (JP); Mitsuo Yamada, Osaka-fu (JP); Seiji Yokoi, Aichi-ken (JP); Satoshi Kodama, Aichi-ken (JP)

(73) Assignees: Nippon Paint Co., Ltd., Osaka-Fu (JP); Toyota Jidosha Kabushiki Kaisha, Aichi-Ken (JP)

( * ) Notice: Subject to any disclaimer, the term of this patent is extended or adjusted under 35 U.S.C. 154(b) by 517 days.

(21) Appl. No.: 10/396,355

(22) Filed: Mar. 26, 2003

(65) Prior Publication Data

US 2004/0026248 A1    Feb. 12, 2004

(30) Foreign Application Priority Data

Mar. 26, 2002    (JP) .............................. 2002-086381

(51) Int. Cl.
*C25D 13/04*    (2006.01)
(52) U.S. Cl. ...................... 204/501; 204/504; 204/506; 204/489; 523/415
(58) Field of Classification Search ................ 204/501, 204/504, 506; 523/415
See application file for complete search history.

(56) References Cited

U.S. PATENT DOCUMENTS

2002/0183421 A1    12/2002    Kojima et al.
2003/0096906 A1*    5/2003    Tazzia et al. ................ 524/800

FOREIGN PATENT DOCUMENTS

| JP | 07-286297 |   | 10/1995 |
|----|-----------|---|---------|
| JP | 07-286297 A | * | 10/1995 |
| JP | 09-235495 |   | 9/1997 |
| JP | 2000-038527 A | * | 2/2000 |
| JP | 2000-204299 |   | 7/2000 |
| JP | 2000-204299 A | * | 7/2000 |

* cited by examiner

*Primary Examiner*—Kishor Mayekar
(74) *Attorney, Agent, or Firm*—Wenderoth, Lind & Ponack, L.L.P.

(57) ABSTRACT

With the use of a lead-free cationic electrodeposition coating composition containing a sulfonium-modified epoxy resin, an amine-modified novolak-type epoxy resin, and a blocked isocyanate curing agent as a binder resin, wherein the content of volatile organic components is 1% by weight or less, the coating liquid conductivity is 1000 to 2500 μS/cm, and the minimum film-forming temperature of the coated layer electrodeposited on an object to be coated is 20 to 35° C., electrodeposition coating is carried out at or above the temperature which is lower by 2° C. than the minimum film-forming temperature and at or below the temperature which is higher by 6° C. than the minimum film-forming temperature.

6 Claims, 1 Drawing Sheet

DRAWINGS

ELECTRODEPOSITION COATING METHOD USING LEAD-FREE CATIONIC ELECTRODEPOSITION COATING COMPOSITION

BACKGROUND OF THE INVENTION

1. Field of the Invention

The present invention relates to a method of electrodeposition coating that hardly generates poor appearance in coating an object to be coated, particularly a zinc steel plate. The method uses a lead-free cationic electrodeposition coating composition with high throwing power and enables electrodeposition coating in short time.

2. Description of the Background Art

Electrodeposition coating method can perform coating of an object to be coated into details and can perform the coating automatically and continuously even if the object to be coated has a complex shape. Therefore, the electrodeposition coating method is widely used as an undercoating method for an object to be coated that has a large and complex shape and needs high rust prevention, such as an automobile body. Further, as compared with other coating methods, the efficiency of using a coating composition is extremely high, so that the method is economical. Therefore, the electrodeposition coating method is widely spread as an industrial coating method. The cationic electrodeposition coating method is carried out by immersing an object to be coated into a cationic electrodeposition coating composition as a cathode, and applying a voltage thereto.

Hitherto, lead has been added to an electrodeposition coating composition in order to improve the corrosion resistance of the coated film. In recent years, there is a demand for reduction of lead that is used in an electrodeposition coating composition because lead gives adverse effects on the environment.

In the meantime, there is a desire for reduction of the amount of use of the coating composition itself in order to decrease the coating costs.

Deposition of coated layer in the process of cationic electrodeposition coating owes to electrochemical reaction, and the coated layer is deposited on a surface of the object to be coated by application of voltage. Since the deposited coated layer has a dielectric property, the electric resistance of the coated layer will increase according as the deposited layer increases in thickness by progression of the deposition of the coated layer during the coating process.

As a result of this, deposition of the coating composition onto said sites decreases and, instead of this, deposition of the coated layer onto noncoated sites starts. In this manner, the solid component of the coating composition is successively deposited to the sites to be coated, thereby completing the coating. In the specification of this application, the property by which the coated layer is successively formed onto non-coated sites of the object to be coated is referred to as "throwing power".

In the cationic electrodeposition coating method, a dielectric coated layer is successively formed onto the surface of the object to be coated as described above, so that the coating composition theoretically has an infinite throwing power that makes it possible to form the coated layer uniformly over the entire surface of the object to be coated.

However, at the non-coated sites of the object to be coated, the voltage applied in the bath becomes weak as compared with the coated sites, so that the solid component of the coating composition hardly attaches to the non-coated sites, therefore the throwing power of the electrodeposition coating composition is not necessarily sufficient, thereby generating uneven layer thickness.

Cationic electrodeposition coating is normally used for undercoating, and a major object thereof is rust prevention or the like, so that the thickness of the coated film on all sites must be above a predetermined value even if the object to be coated has a complex structure. For this reason, if the layer thickness is uneven, the thick parts are coated too much, results in excessive use of the coating composition. Therefore, in order to reduce the amount of use of the coating composition, one must improve the throwing power of the electrodeposition coating composition.

Steel plates that has been heretofore used in an automobile body occupy major parts of the object to be coated for cationic electrodeposition coating. Steel plates are stored by being coated with a rust-preventing oil. Usually, steel plates that has undergone removing this rust-preventing oil with alkali or the like and subjected to surface treatment, are used as an object to be coated.

However, in recent years, electrodeposition coating is often carried out on zinc steel plates in which the surface of steel plates have been plated with zinc. The zinc steel plates are excellent in rust-preventing property as compared with normal steel plates, so that the zinc steel plates can realize an enhanced rust-preventing property if they are used as an object to be coated. On the other hand, if zinc steel plates are used as an object to be coated, pinholes or craters are liable to be generated in the obtained electrodeposition coated layer, thereby a problem in that poor appearance is likely to be generated. The reason for that is considered to be due to facilitated generation of spark discharge in hydrogen gas, because the discharge voltage of hydrogen gas generated on the object to be coated side at the time of cationic electrodeposition coating is lower in the zinc steel plates than in the iron steel plates.

In addition, in recent years, there is a demand for short-time electrodeposition coating in order to improve the productivity. However, short electrodeposition time raises a problem of decrease in the throwing power.

SUMMARY OF THE INVENTION

The present invention has been made in order to solve the aforementioned problems of the prior art, and an objective thereof is to provide a coating method using a lead-free cationic electrodeposition coating composition that hardly generates pinholes or craters in the coated layer even if a zinc steel plate is used as an object to be coated, exhibits excellent economical advantage since the amount of use of the electrodeposition coating composition itself can be small, and has high throwing power that enables short-time electrodeposition with less influence given on the environment.

The present invention provides an electrodeposition coating method comprising the steps of:

(a) providing a lead-free cationic electrodeposition coating composition containing an aqueous medium, a binder resin dispersed or dissolved in the aqueous medium, a neutralizing acid, an organic solvent, and a metal catalyst, wherein the binder resin contains a sulfonium-modified epoxy resin having a milliequivalent number of sulfonium salt group per 100 g resin of 7 to 45, an amine-modified novolak-type epoxy resin having a molecular weight of 700 to 6000, and a blocked isocyanate curing agent, the lead-free cationic electrodeposition coating composition has a volatile organic content of 1% by weight or less, the lead-free cationic electrodeposition coating composition has a coating liquid conductivity of 1000 to 2500 µS/cm, and a coated layer electrodeposited on an object to be coated has a minimum film-forming temperature of 20 to 35° C.;

(b) adjusting the lead-free cationic electrodeposition coating composition to the temperature of from lower by 2° C. than the minimum film-forming temperature to higher by 6° C. than the minimum film-forming temperature;

(c) immersing the object to be coated in the lead-free cationic electrodeposition coating composition; and (d) carrying out electrodeposition using the object to be coated as a cathode under aforementioned temperature condition, whereby the aforesaid object of the present invention is achieved.

Here, the wording "lead-free" means that substantially no lead is contained, that is, the composition does not contain lead in such an amount that gives adverse effects to the environment. Specifically described, the "lead-free" means that the lead compound concentration in an electrodeposition bath is not more than 50 ppm, preferably not more than 20 ppm.

DETAILED DESCRIPTION OF THE INVENTION

The cationic electrodeposition coating composition used in the present invention contains an aqueous medium, a binder resin dispersed or dissolved in the aqueous medium, as well as various additives such as a neutralizing acid, an organic solvent, and a metal catalyst. The binder resin contains a sulfonium-modified epoxy resin, an amine-modified novolak-type epoxy resin, and a blocked isocyanate curing agent. Preferably, the binder resin further contains an amine-modified bisphenol-type epoxy resin. As the aqueous medium, ion exchanged water or the like is generally used.

In the lead-free cationic electrodeposition coating composition used in the present invention, as cationic resins contained in the binder resin, a sulfonium-modified epoxy resin and an amine-modified novolak-type epoxy resin are used, and preferably an amine-modified bisphenol-type epoxy resin is used as well at the same time.

The sulfonium-modified epoxy resin refers to a resin obtained by allowing an epoxy resin to react with a sulfide compound and a neutralizing acid whereby the epoxy group thereof undergoes ring-opening and, at the same time, a sulfonium salt group is introduced.

The amine-modified novolak-type epoxy resin refers to a resin obtained by allowing a novolak-type epoxy resin to react with an amine whereby the epoxy group thereof undergoes ring-opening and, at the same time, an amino group is introduced.

The amine-modified bisphenol-type epoxy resin refers to a resin obtained by allowing a bisphenol-type epoxy resin to react with an amine whereby the epoxy group thereof undergoes ring-opening and, at the same time, an amino group is introduced.

Further, as the blocked isocyanate curing agent, it is preferable to use a blocked polyisocyanate in which the isocyanate group of polyisocyanate is blocked.

Sulfonium-Modified Epoxy Resin

The lead-free cationic electrodeposition coating composition used in the present invention contains an epoxy resin that has been modified with a sulfide compound. This sulfonium-modified epoxy resin may be a conventionally known one such as disclosed, for example, in Japanese Patent Laid-open Publication No. H6(1994)-128351, Japanese Patent Laid-open Publication No. H7(1995)-206968, and others. The sulfonium-modified epoxy resin is produced typically by allowing the epoxy ring of a bisphenol-type epoxy resin to undergo ring-opening with the use of a sulfide compound and a neutralizing acid.

Amine-Modified Bisphenol-Type Epoxy Resin

The lead-free cationic electrodeposition coating composition used in the present invention contains a bisphenol-type epoxy resin that has been modified with an amine. This amine-modified bisphenol-type epoxy resin may be a conventionally known one such as disclosed, for example, in Japanese Patent Laid-open Publication No. S54(1979)-4978, Japanese Patent Laid-open Publication No. S56(1981)-34186, and others. The amine-modified epoxy resin is produced typically by allowing the epoxy ring of a bisphenol-type epoxy resin to undergo ring-opening with the use of an amine.

A typical example of the bisphenol-type epoxy resin is a bisphenol A-type or bisphenol F-type epoxy resin. Commercially available products of the former include Epicoat 828 (manufactured by Yuka Shell Epoxy Co., Ltd., epoxy equivalent: 180 to 190), Epicoat 1001 (the same, epoxy equivalent: 450 to 500), Epicoat 1010 (the same, epoxy equivalent: 3000 to 4000), and others, while commercially available products of the latter include Epicoat 807 (the same, epoxy equivalent: 170) and others.

An oxazolidone-ring-containing epoxy resin such as disclosed in Japanese Patent Laid-open Publication No. H5(1993)-306327, paragraph 0004, chemical formula 3 may be used as the cationic epoxy resin. This is because an electrodeposition coating composition having an excellent throwing power can be obtained, and also a coated film excellent in heat-resistance and corrosion-resistance can be obtained.

As a method for introducing an oxazolidone ring into an epoxy resin, for example a blocked polyisocyanate blocked with a lower alcohol such as methanol is heated with a polyepoxide in the presence of a basic catalyst, followed by removing the lower alcohol produced as a by-product by distillation.

A particularly preferable bisphenol-type epoxy resin is an oxazolidone-ring-containing epoxy resin. This is because a coated film being excellent in heat resistance and corrosion resistance and further being excellent in impact resistance can be obtained.

It is known in the art that an epoxy resin containing an oxazolidone ring can be obtained by allowing a bifunctional epoxy resin to react with diisocyanate blocked with monoalcohol (i.e. bisurethane). A specific method of producing this oxazolidone-ring-containing epoxy resin is disclosed, for example, in Japanese Patent Laid-open Publication No. 2001-128959, paragraphs 0012 to 0047.

These epoxy resins may be modified with suitable resins such as polyester polyol, polyether polyol, and monofunctional alkylphenol. Also, the epoxy resins may be subjected to chain extension by using reaction of epoxy group with diol or dicarboxylic acid.

The amines to be allowed to react with the epoxy group in the bisphenol-type epoxy resin include primary amines and secondary amines. Among such amines, secondary amines are especially preferable. An amine-modified epoxy resin having a tertiary amino group is obtained by allowing an epoxy resin to react with a secondary amine.

Specific examples of amines include butylamine, octylamine, diethylamine, dibutylamine, methylbutylamine, monoethanolamine, diethanolamine, N-methyl ethanolamine, and secondary amines obtained by blocking primary amines such as ketimine of aminoethyl ethanolamine and diketimine of diethylenetriamine. Plural kinds of amines may be used in combination.

The sulfide compounds to be allowed to react with an epoxy resin include all the sulfide compounds that react with an epoxy group and do not contain an interfering group. Here, the reaction between the epoxy resin and the sulfide compound must be carried out in the presence of a neutralizing acid and, as a result of this, a sulfonium group is introduced into the epoxy resin.

Specific examples of the sulfide compounds can be aliphatic sulfides, aliphatic-aromatic mixed sulfides, aralkyl sulfides or cyclic sulfides. Examples of usable sulfide compounds include diethyl sulfide, dipropyl sulfide, ethyl phenyl sulfide, tetramethylene sulfide, pentamethylene sulfide, and others.

An especially preferable sulfide compound is a thiodialcohol represented by the following formula:

wherein R and R' are each independently a linear or branched alkylene group having 2 to 8 carbon atoms. Such a sulfonium-modified epoxy resin has a function of delaying the formation of coated layer resistance for a short period of time (about 10 seconds) immediately after the start of electrodeposition, and also imparts water dispersion stability to the binder resin.

Examples of thiodialcohols include thiodiethanol, ihiodipropanol, thiodibutanol, 1-(2-hydroxyethylthio)-2-propanol, 1-(2-hydroxyethylthio)-2,3-propanediol, 1-(2-hydroxyethylthio)-2-butanol, 1-(2-hydroxyethylthio)-3-butoxy-1-propanol, and others. Most preferably, the sulfide compound is 1-(2-hydroxyethylthio)-2-propanol.

Amine-Modified Novolak-Type Epoxy Resin

The amine-modified novolak-type epoxy resin used in the present invention is produced typically by allowing the epoxy ring of a novolak-type epoxy resin to undergo ring-opening with the use of an amine. As the novolak-type epoxy resin, one can use an epoxy resin represented by the following formula:

wherein R, R', and R'' are each independently hydrogen or a linear or branched alkylene group having 1 to 5 carbon atoms, and the repetition unit number n is 0 to 25.

A typical example of the novolak-type epoxy resin is a phenol novolak resin or a cresol novolak resin. Commercially available products of the former include YDPN-638 (manufactured by Toto Kasei Co., Ltd.) and others, while commercially available products of the latter include YDCN-701 (the same), YDCN-704 (the same), and others.

The amines to be allowed to react with the epoxy group in the novolak-type epoxy resin include primary amines and secondary amines. Among such amines, secondary amines are especially preferable. An amine-modified epoxy resin having a tertiary amino group is obtained by allowing an epoxy resin to react with a secondary amine.

Specific examples of amines include butylamine, octylamine, diethylamine, dibutylamine, methylbutylamine, monoethanolamine, diethanolamine, N-methyl ethanolamine, and secondary amines obtained by blocking primary amines such as ketimine of aminoethyl ethanolamine and diketimine of diethylenetriamine. Plural kinds of amines may be used in combination.

Further, carboxylic acids such as acetic acid, alcohols such as allyl alcohol, and phenols such as nonylphenol may be added partially to the epoxy rings that are present in plural number in the novolak-type epoxy resin.

The reaction of an epoxy resin with a sulfide compound or an amine may be carried out by a method and under a condition that are known to those skilled in the art. The reaction of an epoxy resin with a sulfide compound is disclosed, for example, in Japanese Patent Laid-open Publication No. H6(1994)-128351 and Japanese Patent Laid-open Publication No. H7(1995)-206968. The reaction of an epoxy resin with an amine is disclosed, for example, in Japanese Patent Laid-open Publication No. H5(1993)-306327 and Japanese Patent Laid-open Publication No.2000-128959. Further, the reaction of cationizing these with the use of a neutralizing acid may be carried out by a method and under a condition that are known to those skilled in the art.

In an especially preferable embodiment of the present invention, the binder resin contains a sulfonium-modified epoxy resin, an amine-modified bisphenol-type epoxy resin, and an amine-modified novolak-type epoxy resin. In this case, even in the case where a zinc steel plate is used as an object to be coated, pinholes and craters are hardly generated in the coated layer, thereby providing particular improvements in the zinc steel plate suitability of the obtained electrodeposition coating composition. Further, even if the electrodeposition is carried out in a short period of time, the throwing power can be ensured.

Blocked Isocyanate Curing Agent

The polyisocyanate used in the blocked isocyanate curing agent of the present invention refers to a compound containing at least two isocyanate groups in one molecule. The polyisocyanate may be, for example, any one of aliphatic, alicyclic, aromatic, aromatic-aliphatic, and others.

Specific examples of polyisocyanate include aromatic diisocyanates such as tolylene diisocyanate (TDI), diphenylmethane diisocyanate (MDI), p-phenylene diisocyanate, and naphthalene diisocyanate; aliphatic diisocyanates having 3 to 12 carbon atoms, such as hexamethylene diisocyanate (HDI), 2,2,4-trimethylhexane diisocyanate, and lysine diisocyanate; alicyclic diisocyanates having 5 to 18 carbon atoms, such as 1,4-cyclohexane diisocyanate (CDI), isophorone diisocyanate (IPDI), 4,4-dicyclohexylmethane diisocyanate (hydrogenated MDI), methylcyclohexane diisocyanate, isopropylidenedicyclohexyl-4,4-diisocyanate, 1,3-diisocyanatomethylcyclohexane (hydrogenated XDI), hydrogenated TDI, 2,5- or 2,6-bis(isocyanatomethyl)-bicyclo[2.2.1]heptane (also referred to as norbornane diisocyanate); aliphatic diisocyanates having an aromatic ring such as xylylene diisocyanate (XDI), and tetramethylxylylene diisocyanate (TMXDI); modified products of these diisocyanates (urethane compounds, carbodiimide, uretodione, uretonimine, biuret and/or isocyanurate modified products); and others. These may be used either alone or in combination of two or more kinds thereof.

An addition product or prepolymer obtained by allowing polyisocyanate with a polyhydric alcohol such as ethylene glycol, propylene glycol, trimethylolpropane, or hexanetriol in a NCO/OH ratio of 2 or more may be used as the blocked isocyanate curing agent.

A blocking agent is a substance that is added to a polyisocyanate group and, though being stable at an ambient temperature, capable of reproducing a free isocyanate group when heated to a dissociation temperature or above.

As the blocking agent, one can use those that are generally used, such as ∈-caprolactam and ethylene glycol monobutyl ether (butyl cellosolve). However, in order to reduce the influence on the environment, the amount of use of the blocked isocyanate curing agent is preferably the minimum required.

Pigment

Generally, an electrodeposition coating composition is allowed to contain a pigment as a coloring agent. However, it is preferable that the lead-free cationic electrodeposition coating composition of the present invention is not allowed to contain a pigment. This is because the throwing power of the coating composition is improved.

If a coloring pigment, a rust-preventing pigment, an extender pigment, and others are to be contained in order to impart coloring or corrosion resistance to the coated film, the ratio by weight (P/V) of the pigment contained in the coating composition to the solid resin components, becomes a value equal to or smaller than 1/9. If the ratio by weight of the pigment in the coating composition to the solid resin components exceeds 1/9, the throwing power decreases because the deposition property of the solid components of the coating composition lowers. In addition, the specific weight of the coated layer increases to invite increase in the amount of use.

Pigments that may be contained in the lead-free cationic electrodeposition coating composition used in the present invention are not particularly limited as long as they are pigments generally used. Examples thereof include coloring pigments such as titanium oxide, and carbon black, extender pigments such as kaolin, talc, aluminum silicate, calcium carbonate, mica, clay and silica, and rust-preventing pigments such as zinc phosphate, iron phosphate, aluminum phosphate, calcium phosphate, zinc phosphite, zinc cyanide, zinc oxide, aluminum tripolyphosphate, aluminum molybdate, calcium molybdate, aluminum phosphomolybdate, and aluminum zinc phosphomolybdate.

Pigment-Dispersed Paste

When a pigment is to be used as a component of the electrodeposition coating composition, the pigment is generally dispersed in advance into an aqueous medium at a high concentration to form a paste. This is because, since the pigment is powdery, it is difficult to disperse the pigment in one step into a uniform low-concentration state that is used in the electrodeposition coating composition. Generally, such a paste is referred to as a pigment paste.

The pigment-dispersed paste is prepared by dispersing a pigment together with a pigment-dispersing resin into an aqueous medium. The pigment-dispersing resin to be used is generally a cationic or nonionic low-molecular-weight surfactant or a cationic polymer such as a modified epoxy resin having a quaternary ammonium group and/or tertiary sulfonium group. The aqueous medium to be used is ion exchange water, water containing a small amount of alcohols, or the like. Generally, the blending ratio of the pigment-dispersing resin to the pigment (pigment-dispersing resin/pigment) is 10/100 to 50/100 by solid component based on weight.

Metal Catalyst

As a catalyst for improving the corrosion resistance of the coated film, the lead-free cationic electrodeposition coating composition to be used in the present invention may be allowed to contain a metal catalyst as metal ions. Preferable metal ions are cerium ions, bismuth ions, copper ions, and zinc ions. These are blended into the electrodeposition coating composition as a salt obtained by being combined with a suitable acid or as an elute from a pigment which contains metal ions. The acid may be any one of inorganic acids and organic acids such as hydrochloric acid, nitric acid, phosphoric acid, formic acid, acetic acid, and lactic acid. A preferable acid is acetic acid.

Electrodeposition Coating Composition

The lead-free cationic electrodeposition coating composition to be used in the present invention is prepared by dispersing or dissolving the aforementioned metal catalyst, sulfonium-modified epoxy resin, amine-modified bisphenol-type epoxy resin, amine-modified novolak-type epoxy resin, blocked isocyanate curing agent, and an optional pigment-dispersed paste into an aqueous medium. Further, the aqueous medium is usually allowed to contain a neutralizing acid in order to disperse or dissolve the sulfonium-modified epoxy resin, amine-modified bisphenol-type epoxy resin, and amine-modified novolak-type epoxy resin stably into the aqueous medium. The neutralizing acid is an inorganic acid or an organic acid such as hydrochloric acid, nitric acid, phosphoric acid, formic acid, acetic acid, or lactic acid.

In the electrodeposition coating composition to be used in the present invention, the milliequivalent number of the sulfonium salt group contained in a sum of 100 g of the sulfonium-modified epoxy resin is from 7 to 45, preferably 10 to 35. If the milliequivalent number of the sulfonium salt group is less than 5 milliequivalent, the sulfonium-modified epoxy resin will have an insufficient hydrophilicity, whereby the dispersion stability of the coating composition cannot be maintained, while if the milliequivalent number exceeds 45 milliequivalent, the coating composition will have an inferior throwing power.

Further, the milliequivalent number of the neutralizing acid required for neutralizing a sum of 100 g of the amine-modified bisphenoltype epoxy resin is from 7 to 45, preferably 10 to 35. If the amount of the neutralizing acid is less than 7 milliequivalent, the amine-modified-bisphenol-type epoxy resin will have an insufficient hydrophilicity, whereby the dispersion stability of the coating composition cannot be maintained, while if the amount exceeds 45 milliequivalent, the coating composition will have an inferior throwing power.

As a method for blending an amine-modified bisphenol-type epoxy resin, a sulfonium-modified epoxy resin, and a blocked isocyanate as a curing agent and dispersing these into an aqueous medium, one may mix the blocked isocyanate into each of or any one of the amine-modified bisphenol-type epoxy resin and-the sulfonium-modified epoxy resin to form two resin solutions, emulsify the two resin solutions, and mix the resultant emulsions. Alternatively, one may mix the amine-modified bisphenol-type epoxy resin, the sulfonium-modified epoxy resin, and the blocked isocyanate in a solution state in advance, and emulsify the resin solution.

The amine-modified novolak-type epoxy resin may be neutralized by a neutralizing acid for use. The amount of the neutralizing acid is not particularly limited. The required amount is equal to or more than the minimum amount that can disperse stably in the aqueous medium; however, the amount depends on the kind of the amine to be added and the kind of the neutralizing acid. This amine-modified novolak-type epoxy resin has a function of adjusting the liquid conductivity of the cationic electrodeposition coating composition to be within the optimal range that provides excellent throwing power and does not deteriorate the zinc steel plate suitability.

The mixing ratio of the amine-modified bisphenol-type epoxy resin to the sulfonium-modified epoxy resin is within the range from 0/100 to 90/10, preferably from 30/70 to 70/30 in ratio by weight. If the mixing ratio of the two exceeds 90/10, the poor appearance of the coated layer on a zinc steel plate is hardly dissolved.

The content of the amine-modified novolak-type epoxy resin is not particularly limited; however, the content is within a range such that the liquid conductivity of the cationic electrodeposition coating composition is 1000 to 2500 μS/cm. If the liquid conductivity of the cationic electrodeposition coating composition is less than 1000 μS/cm, the throwing power in a short period of time will be inferior. If the liquid conductivity exceeds 2500 μS/cm, the poor appearance of the coated layer on a zinc steel plate is hardly dissolved.

In the electrodeposition coating composition to be used in the present invention, the molecular weight of the amine-modified novolak-type epoxy resin is from 700 to 6000, preferably 1500 to 5000. If the molecular weight of the amine-modified novolak-type epoxy resin is less than 700, the zinc steel plate suitability will be inferior, whereas if the molecular weight of the amine-modified novolak-type epoxy resin exceeds 6000, the viscosity at the time of baking will be high, thereby decreasing the finished appearance.

Regarding a method of dispersing or dissolving the amine-modified novolak-type epoxy resin into an aqueous medium, one may liquidize the amine-modified novolak-type epoxy resin by melting or with a suitable solvent, and add thereto an aqueous medium that contains a neutralizing acid in advance with stirring. The solvent added at this step is preferably removed with conducting a desolvation step later on.

The amount of the blocked isocyanate curing agent must be sufficient enough to impart a good cured coated film by reacting with active-hydrogen-containing functional groups such as the primary hydroxyl groups and secondary hydroxyl groups in the sulfonium-modified epoxy resin, and the primary amino groups, secondary amino groups, primary hydroxyl groups, and secondary hydroxyl groups in the amine-modified bisphenoltype epoxy resin and the amine-modified novolak-type epoxy resin at the time of curing. The solid component ratio by weight of the sum of the sulfonium-modified epoxy resin, the amine-modified bisphenol-type epoxy resin, and the amine-modified novolak-type epoxy resin to the blocked isocyanate curing agent (epoxy resin/curing agent) is within a range from 1/1 to 9/1, preferably 2/1 to 4/1.

The coating composition can contain a tin compound such as dibutyltin dilaurate or dibutyltin oxide, and an ordinary urethane cleaving catalyst. Since the coating composition contains substantially no lead, the amount thereof is preferably from 0.1 to 5% by weight of the solid resin components.

An organic solvent is essentially needed as a solvent for synthesizing resin components such as amine-modified bisphenol-type epoxy resin, sulfonium-modified epoxy resin, blocked isocyanate curing agent, amine-modified novolak-type epoxy resin, and pigment-dispersing resin, and a cumbersome procedure is required to remove the organic solvent completely. Further, if the binder resin contains an organic solvent, the coated layer will have an improved fluidity when the layer is formed, thereby improving the smoothness of the coated layer. Therefore, there is no need to remove these organic solvents completely from the resin components, and an additional organic solvent may be added thereto.

Examples of organic solvents usually contained in the coating composition include ethylene glycol monobutyl ether, ethylene glycol monohexyl ether, ethylene glycol mono-2-ethylhexyl ether, propylene glycol monobutyl ether, dipropylene glycol monobutyl ether, propylene glycol monophenyl ether, and others.

The organic solvents listed above are usually referred to as volatile organic component. The volatile organic component is defined in the present invention as the organic solvents having a boiling point of 250° C. or less. Content of the volatile organic component is generally described as VOC.

The lead-free cationic electrodeposition coating composition to be used in the present invention preferably has a content of the volatile organic component (VOC) of lower as compared to the conventional ones. This is to prevent giving adverse effects to the environment. Specifically, the VOC of the coating composition is 1% by weight or less, preferably 0.5 to 0.8% by weight, more preferably 0.2 to 0.5% by weight. If the VOC of the coating composition exceeds 1% by weight, the adverse effects given to the environment will be large, and also the coated layer resistance value will decrease due to improvement of fluidity of the deposited coated layer, thereby the throwing power of the coating composition may decrease.

As to the method for controlling VOC not more than 1% by weight, for example, an organic solvent employed for viscosity control at the time of conducting reaction may be reduced in its content by the reaction being conducted at higher temperature in lower solvent. An organic solvent inevitably employed at the time of conducting reaction, may be recovered by a desolvation process by such a means of employing a low boiling-point solvent, thereby VOC of the end product may be reduced. An organic solvent employed for viscosity control at the time of coating may be reduced in its content by modifying the resin with soft segment so as to have lower viscosity.

In addition to those mentioned above, the coating composition can contain additives for coating that are generally used, such as plasticizers, surfactants, antioxidants, and ultraviolet absorbers.

The lead-free cationic electrodeposition coating composition used in the present invention is electrodeposited for coating an object to be coated by a method known to those skilled in the art, so as to form an electrodeposited coated layer (not cured yet). The object to be coated is not particularly limited as long as it has electrical conductivity. Examples of object to be coated include iron plates, steel plates, aluminum plates, these plates subjected to surface treatment, and the molded products of these.

A preferable object to be coated is a zinc steel plate. This is because the lead-free cationic electrodeposition coating composition of the present invention hardly generates pinholes or craters in the coated layer even if a zinc steel plate is coated with the coating composition, by delaying the formation of coated layer resistance for a short period of time (about 10 seconds) after the start of electrodeposition. This provides a coated product having an excellent appearance.

The electrodeposited coated layer preferably has a layer thickness of 10 to 20 μm. If the layer thickness is less than 10 μm, the rust-preventing property will be insufficient, while if the layer thickness exceeds 20 μm, it will lead to wasteful use of the coating composition. In addition, the minimum film-forming temperature (MFT) of the coated layer electrodeposited on the object to be coated is preferably higher than that of the conventional ones. This is because the throwing power of the electrodeposition coating composition will be improved.

Specifically, the electrodeposition coated layer has a MFT of 20 to 35° C. If the MFT is less than 20° C., the coated layer may flow by small quantity of heat, layer thickness easily increases, and throwing power may be harmed. If the MFT is more than 35° C., the coated layer does not sufficiently flow by heat, and appearance becomes poor. Preferably the electrodeposition coated layer has a MFT of 22 to 32° C.

It is not clear the reason why throwing power of the electrodeposition coating composition is improved by raising MFT higher than that used to be, but it is thought that layer thickness is prevented from unnecessary increasing because the MFT comes close to the coating bath temperature, and thereby interior-exterior deposition rate is improved. The MFT of the electrodeposition coated layer may be controlled according to any method known to those skilled in the art. For example, modifying combination ratio of component resins, modifying Tg of deposited resin, and modifying amount of solvent, are exemplified.

The wording "MFT" means the minimum temperature required for binding thermoplastic resin particles of the coating composition each other to form an integral film. The MFT is determined as follows.

An electrodeposition coating composition to be tested is filled in an electrodeposition bath, and is regulated to have a temperature of 10° C. A suitable substrate is dipped and applied electric current of 200 V for 3 minutes. The coated substrate is took out from the electrodeposition bath and dried and baked with a predetermined condition. The coated film is weighed. The temperature of the electrodeposition bath is raised one degree, and the procedure is repeated at every one degree up to 40° C. The minimum film-forming temperature (MFT) is determined as the bath temperature at which the coated film weight per predetermined area attains the minimum value.

In the present invention, the electrodeposition bath temperature at the time of coating is within a range from the temperature which is lower by 2° C. than the MFT to the temperature which is higher by 6° C. than the MFT. A preferable range of the electrodeposition bath temperature is a range from the temperature which is lower by 1° C. than the MFT to the temperature which is higher by 5° C. than the MFT.

If the electrodeposition bath temperature is lower than the temperature which is lower by 2° C. than the MFT or if the electrodeposition bath temperature is higher than the temperature which is higher by 6° C. than the MFT, the throwing power will decrease. This is considered to be because the electrodeposition bath temperature at the time of coating is far away from the minimum film-forming temperature.

After the electrodeposition process, the electrodeposited coated layer obtained in this manner is cured by baking at 120 to 260° C., preferably at 160 to 220° C., for 10 to 30 minutes either as it is or after it is washed with water.

The coating method using the lead-free cationic electrodeposition coating composition of the present invention hardly generates poor appearance even if a zinc steel plate is used as an object to be coated, and also exhibits an excellent productivity and economical advantage with less influence given on the environment since the coating composition has an excellent throwing power, the amount of use of the electrodeposition coating composition itself can be small, and the coating composition enables short-time electrodeposition.

The present invention will be described in detail by raising Examples; however, the present invention is by no means limited to these Examples. In the Examples, "parts" and "%" are based on weight standard unless specifically mentioned.

EXAMPLES

Production Example 1

Production of Blocked Isocyanate Curing Agent

A reaction vessel was filled with 1250 parts of diphenylmethane diisocyanate and 266.4 parts of methyl isobutyl ketone (hereafter referred to as "MIBK") and, after this was heated to 80° C., 2.5 parts of dibutyltin dilaurate was added. Into this, a solution obtained by dissolving 226 parts of ∈-caprolactam into 944 parts of butyl celiosolve was dropwise added at 80° C. in two hours. Further, after this was heated at 100° C. for four hours, it was confirmed that absorption based on isocyanate groups disappeared by measurement of IR spectrum. After being left to stand for cooling, 336.1 parts of MIBK was added to obtain a blocked isocyanate curing agent.

Production Example 2

Production of Amine-Modified Bisphenol-Type Epoxy Resin

A flask equipped with a stirrer, a cooling tube, a nitrogen-introducing pipe, a thermometer, and a dropping funnel was filled with 87 parts of 2,4-/2,6-tolylene diisocyanate (ratio by weight=8/2), 85 parts of MIBK, and 0.1 part of dibutyltin dilaurate. While the reaction mixture was being stirred, 32 parts of methanol was dropwise added. The reaction was started at room temperature, and heat generation raised the temperature to 60° C. The reaction was mainly conducted within a range from 60 to 65° C., and was continued until absorption based on isocyanate groups disappeared by measurement of IR spectrum.

Next, 550 parts of epoxy resin having an epoxy equivalent of 188, which had been synthesized from bisphenol A and epichlorohydrin by a known method, was added to the reaction mixture, and then the temperature was raised to 125° C. Thereafter, 1.0 part of benzyldimethylamine was added, and the reaction was carried out at 130° C. until the epoxy equivalent became 330.

Subsequently, 100 parts of bisphenol A and 36 parts of octylic acid were added, and the reaction was carried out at 120° C., whereby the epoxy equivalent became 1030. Thereafter, 107 parts of MIBK was added; the reaction mixture was cooled; 79 parts of diethanolamine was added; and the reaction was carried out at 110° C. for two hours. Thereafter, the resultant was diluted with MIBK until the non-volatile content of 80%, thereby to, obtain an epoxy resin (with solid resin content of 80%) having tertiary amino salt groups.

The obtained resin was mixed with the blocked isocyanate curing agent obtained in Production Example 1 at solid component ratio of 70/30 to form a uniform mixture. Thereafter, formic acid was added so that the milliequivalent number of the acid per 100 g resin of the solid resin components would be 25, followed by adding ion exchange water slowly for dilution. Removal of MIBK under reduced pressure yielded an emulsion of amine-modified bisphenol-type epoxy resin having a solid content of 36% and containing blocked isocyanate.

Production Example 3

Production of Sulfonium-Modified Epoxy Resin

A flask equipped with a stirrer, a cooling tube, a nitrogen-introducing pipe, a thermometer, and a dropping funnel was filled with 87 parts of 2,4-/2,6-tolylene diisocyanate (ratio by weight=8/2), 85 parts of MIBK, and 0.1 part of dibutyltin dilaurate. While the reaction mixture was being stirred, 32 parts of methanol was dropwise added. The reaction was started at room temperature, and heat generation raised the temperature to 60° C. The reaction was mainly conducted within a range from 60 to 65° C., and was continued until absorption based on isocyanate groups disappeared by measurement of IR spectrum.

Next, 550 parts of epoxy resin having an epoxy equivalent of 188, which had been synthesized from bisphenol A and epichlorohydrin by a known method, was added to the reaction mixture, and then the temperature was raised to 125° C. Thereafter, 1.0 part of benzyldimethylamine was added, and the reaction was carried out at 130° C. until the epoxy equivalent became 330.

Subsequently, 100 parts of bisphenol A and 36 parts of octylic acid were added, and the reaction was carried out at 120° C., whereby the epoxy equivalent became 1030. Thereafter, 107 parts of MIBK was added; the reaction mixture was cooled; 52 parts of SHP-100 (1-(2-hydroxyethylthio)-2-propanol, manufactured by Sanyo Kasei Co., Ltd.), 21 parts of ion exchange water, and 39 parts of 88% lactic acid were added; and the reaction was carried out at 80° C. The reaction was continued until the acid value fell below 5, thereby to obtain an epoxy resin (with solid resin content of 80%) having tertiary sulfonium salt groups.

The obtained resin was mixed with the blocked isocyanate curing agent obtained in Production Example 1 at solid component ratio of 70/30 to form a uniform mixture. Thereafter, ion exchange water was added slowly for dilution. Removal of MIBK under reduced pressure yielded an emulsion of sulfonium-modified epoxy resin having a solid content of 36% and containing blocked isocyanate. The milliequivalent of salt group per 100 g resin of the solid resin components of this emulsion was 20.

Production Example 4

Production of Amine-Modified Novolak-Type Epoxy Resin

A flask equipped with a stirrer, a cooling tube, a nitrogen-introducing pipe, and a thermometer was filled with 204 parts of MIBK, and the temperature was raised to 100° C. Into the flask, 204 parts of cresol novolak resin YD-CN 703 (manufactured by Toto Kasei Co., Ltd., epoxy equivalent: 204) was slowly added and dissolved to obtain a 50% solution of epoxy resin. Subsequently, a flask equipped with a stirrer, a cooling tube, a nitrogen-introducing pipe, a thermometer, and a dropping funnel, which was different from the aforesaid flask, was filled with 75.1 parts of N-methylethanolamine and 32.2 parts of MIBK, and the temperature was raised to 120° C. Into this, 408 parts of the 50% solution of epoxy resin obtained in the above was dropwise added in three hours. Thereafter, the temperature was maintained at 120° C. for two hours. Then, the mixture was cooled to 80° C.

Further, an aqueous solution obtained by diluting 24.8 parts of 88% formic acid with 15.9 parts of ion exchange water was added and the resultant was mixed at 80° C. for 30 minutes. Subsequently, 489.4 parts of deionized water was added for dilution. Removal of MIBK under reduced pressure yielded an aqueous solution of amine-modified novolak-type epoxy resin having a solid content of 34%. Measurement of molecular weight by GPC on this amine-modified novolak-type epoxy resin showed that the number-average molecular weight was 3500.

Production Example 5

Production of Amine-Modified Novolak-Type Epoxy Resin

In a flask, 167 parts of MIBK and 167 parts of bisphenol F-type resin YDF-170 (manufactured by Toto Kasei Co., Ltd., epoxy equivalent: 167) were mixed by stirring to yield a 50% solution of epoxy resin. Subsequently, a flask equipped with a stirrer, a cooling tube, a nitrogen-introducing pipe, a thermometer, and a dropping funnel, which was different from the aforesaid flask, was filled with 75.1 parts of N-methylethanolamine and 32.2 parts of MIBK, and the temperature was raised to 120° C. Into this, 334 parts of the 50% solution of epoxy resin obtained in the above was dropwise added in three hours. Thereafter, the temperature was maintained at 120° C. for two hours. Then, the mixture was cooled to 80° C.

Further, an aqueous solution obtained by diluting 24.8 parts of 88% formic acid with 15.9 parts of ion exchange water was added and the resultant was mixed at 80° C. for 30 minutes. Subsequently, 489.4 parts of deionized water was added for dilution. Removal of MIBK under reduced pressure yielded an aqueous solution of amine-modified novolak-type epoxy resin having a solid content of 34%. Measurement of molecular weight by GPC on this amine-modified novolak-type epoxy resin showed that the number-average molecular weight was 500.

Production Example 6

Production of Pigment-Dispersing Resin

First, a reaction vessel equipped with a stirring apparatus, a cooling tube, a nitrogen-introducing pipe, and a thermometer was filled with 222.0 parts of isophorone diisocyanate (hereafter referred to as IPDI) and, after dilution with 39.1 parts of MIBK, 0.2 part of dibutyltin dilaurate was added to this. Thereafter, the temperature of this mixture was raised to 50° C., and 131.5 parts of 2-ethylhexanol was dropwise added with stirring in a dried nitrogen atmosphere in two hours. By suitably cooling, the reaction temperature was maintained at 50° C. This resulted in 2-ethylhexanol half-blocked IPDI (having a solid resin content of 90.0%).

Next, 87.2 parts of dimethylethanol, 117.6 parts of an aqueous solution of 75% lactic acid, and 39.2 parts of ethylene glycol monobutyl ether were successively added into a suitable reaction vessel, followed by stirring at 65° C. for about half an hour to prepare a quaternarizing agent.

Next, a suitable reaction vessel was filled with 710.0 parts of EPON 829 (bisphenol A-type epoxy resin manufactured by Shell Chemical Co., Ltd., epoxy equivalent: 193 to 203) and 289.6 parts of bisphenol A, followed by heating to 150 to 160° C. under nitrogen atmosphere to start an initial exothermic reaction. The reaction mixture was allowed to react at 150 to 160° C. for about one hour and then, after the resultant was cooled to 120° C., 498.8 parts of the 2-ethylhexanol half-blocked IPDI (MIBK solution) prepared in the above was added.

The reaction mixture was maintained at 110 to 120° C. for about one hour, and then 463.4 parts of ethylene glycol monobutyl ether was added. After the mixture was cooled to 85 to 95° C. to form a uniform mixture, 196.7 parts of the quaternarizing agent prepared in the above was added. After the reaction mixture was maintained at 85 to 95° C. until the acid value became 1, 964 parts of deionized water was added to complete the quaternarization in the epoxy bisphenol A resin, thereby to yield a pigment-dispersing resin (resin for dispersing pigments) having quaternary ammonium salt parts (solid resin content: 50%).

Production Example 7

Production of Pigment-Dispersed Paste

Into a sand grind mill, 120 parts of the pigment-dispersing resin obtained in Production Example 6, 2.0 parts of carbon black, 100.0 parts of kaolin, 80.0 parts of titanium dioxide, 18.0 parts of aluminum phosphomolybdate, and 221.7 parts of ion exchange water were filled, followed by dispersion until the particle size became equal to or less than 10 μm to yield a pigment paste (solid content: 48%).

Example 1

The amine-modified bisphenol-type epoxy resin emulsion obtained in Production Example 2 and the sulfonium-modified epoxy resin emulsion obtained in Production Example 3 were mixed at a solid component ratio of 50/50 and, with respect to a sum of 100 parts of the solid components of the two emulsions, 3 parts (in terms of solid components) of the aqueous solution of amine-modified novolak-type epoxy resin obtained in Production Example 4 was added. Further, 1% by weight of dibutyltin oxide relative to the solid resin components and ion exchange water were incorporated to yield a cationic electrodeposition coating composition having a solid content of 20%. The minimum film-forming temperature of this coating composition was determined to be 30° C. by measurement. Further, the coating liquid conductivity was 1600 μS/cm. Using the obtained cationic electrodeposition coating composition, electrodeposition coating was carried out by setting the electrodeposition bath temperature to be higher by 2° C. than the MFT (i.e. 32° C.) to evaluate the throwing power and the zinc steel plate suitability by a method that will be described later. The results are shown in Table 1.

Example 2

The aqueous solution of amine-modified novolak-type epoxy resin obtained in Production Example 4 was added to the sulfonium-modified epoxy resin emulsion obtained in Production Example 3, in an amount of 6 parts in terms of solid component with respect to 100 parts of the total solid components of the sulfonium-modified epoxy resin emulsion. Further, 1% by weight relative to the solid resin components and ion exchange water were incorporated to yield a cationic electrodeposition coating composition having a solid content of 20%. The amine-modified resin emulsion was not used. The minimum film-forming temperature of this coating composition was determined to be 33° C. by measurement. Further, the coating liquid conductivity was 2000 μS/cm. Using the obtained cationic electrodeposition coating composition, electrodeposition coating was carried out by setting the electrodeposition bath temperature to be equal to the MFT (i.e. 33° C.) to make evaluations in the same manner as in Example 1. The results are shown in Table 1.

Example 3

To the cationic electrodeposition resin composition having the same ratio of components as in Example 2, the pigment-dispersed resin paste of Production Example 7 was added so that the solid component ratio of the pigment component to the resin component would be 1/10, followed by adding ion exchange water to yield the cationic electrodeposition coating composition of Example 3 having a solid content of 20%. The minimum film-forming temperature of this coating composition was determined to be 32° C. by measurement. Further, the coating liquid conductivity was 1900 μS/cm. Using the obtained cationic electrodeposition coating composition, electrodeposition coating was carried out by setting the electrodeposition bath temperature to be higher by 4° C. than the MFT (i.e. 36° C.) to make evaluations in the same manner as in Example 1. The results are shown in Table 1.

Example 4

The amine-modified bisphenol-type epoxy resin emulsion obtained in Production Example 2 and the sulfonium-modified epoxy resin emulsion obtained in Production Example 3 were mixed at a solid component ratio of 70/30 and, with respect to a sum of 100 parts of the solid components of the two emulsions, 2.5 parts in terms of solid component of the aqueous solution of amine-modified novolak-type epoxy resin obtained in Production Example 4 was added. Further, 1% by weight of dibutyltin oxide relative to the solid resin components and ion exchange water were incorporated to yield a cationic electrodeposition coating composition having a solid content of 20%. The minimum film-forming temperature of this coating composition was determined to be 30° C. by measurement. Further, the coating liquid conductivity was 1600 μS/cm. Using the obtained cationic electrodeposition coating composition, electrodeposition coating was carried out by setting the electrodeposition bath temperature to be lower by 2° C. than the MFT (i.e. 28° C.) to make evaluations in the same manner as in Example 1. The results are shown in Table 1.

Comparative Example 1

The amine-modified bisphenol-type epoxy resin emulsion obtained in Production Example 2 and the sulfonium-modified epoxy resin emulsion obtained in Production Example 3 were mixed at a solid component ratio of 50/50. The amine-modified novolak-type epoxy resin was not added. Further, 1% by weight of dibutyltin oxide relative to the solid resin components and ion exchange water were incorporated to yield a cationic electrodeposition coating composition having a solid content of 20%. The minimum film-forming temperature of this coating composition was determined to be 30° C. by measurement. Further, the coating liquid conductivity was 900 µS/cm. Using the obtained cationic electrodeposition coating composition, electrodeposition coating was carried out by setting the electrodeposition bath temperature to be higher by 2° C. than the MFT (i.e. 32° C.) to make evaluations in the same manner as in Example 1. The results are shown in Table 1.

Comparative Example 2

To the cationic electrodeposition coating composition obtained in Example 1, 5% by weight of ethylene glycol monohexyl ether (n-hexylcellosolve) relative to the solid resin components was added. The minimum film-forming temperature of this coating composition was determined to be 18° C. by measurement. Further, the coating liquid conductivity was 1550 µS/cm. Using the obtained cationic electrodeposition coating composition, electrodeposition coating was carried out by setting the electrodeposition bath temperature to be higher by 12° C. than the MFT (i.e. 30° C.) to make evaluations in the same manner as in Example 1. The results are shown in Table 1.

Comparative Example 3

The amine-modified bisphenol-type epoxy resin emulsion obtained in Production Example 2 and the sulfonium-modified epoxy resin emulsion obtained in Production Example 3 were mixed at a solid component ratio of 50/50 and, with respect to a sum of 100 parts of the solid components of the two emulsions, 8 parts in terms of solid component of the aqueous solution of amine-modified novolak-type epoxy resin obtained in Production Example 4 was added. Further, 1% by weight of dibutyltin oxide relative to the solid resin components and ion exchange water were added to yield a cationic electrodeposition coating composition having a solid content of 20%. The minimum film-forming temperature of this coating composition was determined to be 34° C. by measurement. Further, the coating liquid conductivity was 3000 µS/cm. Using the obtained cationic electrodeposition coating composition, electrodeposition coating was carried out by setting the electrodeposition bath temperature to be equal to the MFT (i.e. 34° C.) to make evaluations in the same manner as in Example 1. The results are shown in Table 1.

Comparative Example 4

The amine-modified bisphenol-type epoxy resin emulsion obtained in Production Example 2 and the sulfonium-modified epoxy resin emulsion obtained in Production Example 3 were mixed at a solid component ratio of 50/50 and, with respect to a sum of 100 parts of the solid components of the two emulsions, 2.5 parts in terms of solid component of the aqueous solution of amine-modified novolak-type epoxy resin obtained in Production Example 5 was added. Further, 1% by weight of dibutyltin oxide relative to the solid resin components and ion exchange water were added to yield a cationic electrodeposition coating composition having a solid content of 20%. The minimum film-forming temperature of this coating composition was determined to be 28° C. by measurement. Further, the coating liquid conductivity was 1650 µS/cm. Using the obtained cationic electrodeposition coating composition, electrodeposition coating was carried out by setting the electrodeposition bath temperature to be higher by 2° C. than the MFT (i.e. 30° C.) to make evaluations in the same manner as in Example 1. The results are shown in Table 1.

The cationic electrodeposition coating compositions obtained in Examples and Comparative Examples as well as the cation electrodeposited coating films obtained by baking were evaluated by the following method.

<Throwing Power>

Figure 1:
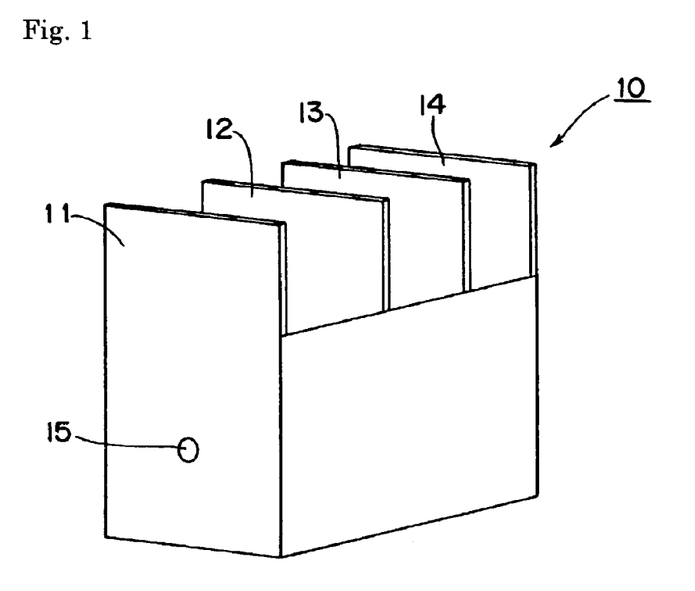
FIG. 1 is a perspective view illustrating one example of a box used in evaluating the throwing power.

The throwing power was evaluated by what is known as the foursheets box method. Namely, referring to FIG. 1, four sheets of zinc phosphate treated steel plates (JIS G3141 SPCC-SD treated with Surfdine SD-5000 (manufactured by Nippon Paint Co., Ltd.)) 11 to 14 were filled in parallel at an interval of 20 mm in an upright state, and a box 10 was prepared by closing the lower parts of the two sides and the bottom surface with an insulator such as a cloth adhesive tape. Provided, a through-hole 15 with 8 mm φ is disposed at the lower part of each of steel plates 11 to 13 except steel plate 14.

Figure 2:
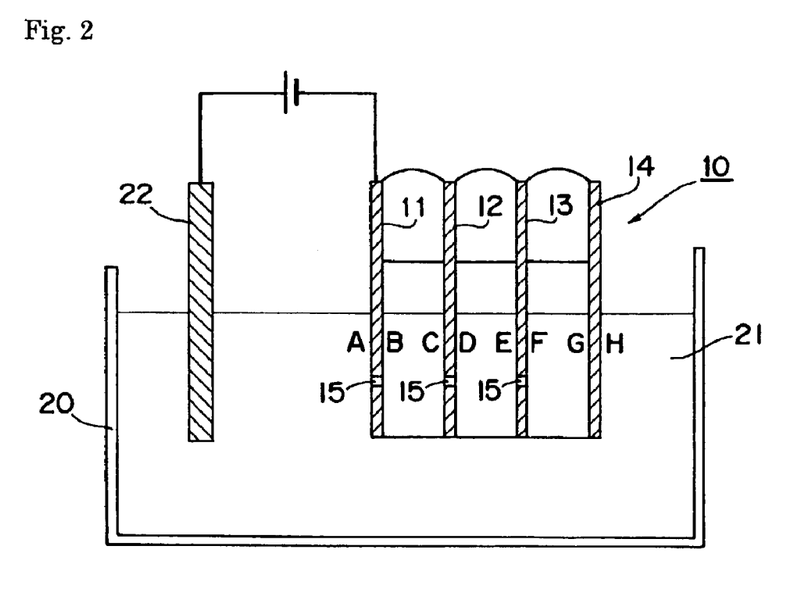
FIG. 2 is a cross-sectional view illustrating a method of evaluating the throwing power.

The first electrodeposition bath was prepared by transferring four liters of cationic electrodeposition coating composition to a vessel made of vinyl chloride. Referring to FIG. 2, the aforesaid box 10 was immersed as an object to be coated into electrodeposition coating composition vessel 20 containing electrodeposition coating composition 21. In this case, coating composition 21 penetrates into box 10 only through each through-hole 15.

Coating composition 21 was stirred with a magnetic stirrer (not illustrated). Then, steel plates 11 to 14 were electrically connected to each other, and an opposing electrode 22 was filled so that the distance to the nearest steel plate 11 would be 150 mm. A voltage was applied with each of the steel plates 11 to 14 serving as a cathode and the opposing electrode 22 serving as an anode, so as to perform cationic electrodeposition coating on the steel plates. The coating was carried out by raising the voltage to a voltage such that the layer thickness of the coated layer formed on the A surface of steel plate 11 would reach 15 µm in five seconds from the start of the application of the voltage, and thereafter maintaining the voltage for 175 seconds in ordinary electrodeposition or for 115 seconds in short-time electrodeposition.

Each of the steel plates that have gone through the coating process was baked at 170° C. for 25 minutes after being washed with water. After being cooled with air, the film thickness of the coated film formed on the A surface of the steel plate 11 which is the nearest to the opposing electrode 22 and the film thickness of the coated film formed on the G surface of the steel plate 14 which is the farthest to the opposing electrode 22 were measured, so as to evaluate the throwing power by the ratio (G/A value) of layer thickness (G surface)/layer thickness (A surface). If this value exceeded 50%, it was determined as good (reference symbol; ◯), whereas if this value was 50% or below, it was determined as poor (reference symbol; X).

<Zinc Steel Plate Suitability>

An alloyed molten zinc plated steel plate subjected to chemical conversion treatment was coated by electrodeposition in 175 seconds after the voltage was raised to 220V in five seconds. Thereafter, the steel plate was washed with water and baked at 170° C. for 25 minutes to observe the coated state. When no abnormality was recognized in the coated film, it was determined as good (reference symbol; ◯). If slight abnormality was recognized, it was determined as abnormality present (reference symbol; Δ). If conspicuous abnormality was recognized, it was determined as poor (reference symbol; X).

TABLE 1

|  | Ex. 1 | Ex. 2 | Ex. 3 | Ex. 4 | C. Ex. 1 | C. Ex. 2 | C. Ex. 3 | C. Ex. 4 |
|---|---|---|---|---|---|---|---|---|
| Cationic resin blending ratio (Amine-modified/Sulfonium-modified) | 50/50 | 0/100 | 30/70 | 70/30 | 50/50 | 70/30 | 50/50 | 50/50 |
| MFT(° C.) | 30 | 33 | 32 | 30 | 30 | 18 | 34 | 28 |
| Electrodeposition bath temperature (° C.) | 32 | 33 | 36 | 28 | 32 | 30 | 34 | 30 |
| Difference of electrodeposition bath temperature to MFT | MFT + 2 | MFT | MFT + 4 | MFT − 2 | MFT + 2 | MFT + 12 | MFT | MFT + 2 |
| Coating liquid conductivity (μS/cm) | 1600 | 2000 | 1900 | 1600 | 900 | 1550 | 3000 | 1650 |
| Pigment content (% in the solid components) | 0 | 0 | 9 | 0 | 0 | 0 | 0 | 0 |
| Presence or absence of amine-modified novolak epoxy resin | present | present | present | present | absent | present | present | present |
| Number-average molecular weight of amine-modified novolak epoxy resin | 3500 | 3500 | 3500 | 3500 | — | 3500 | 3500 | 500 |
| Throwing power in ordinary electrodeposition | ○ | ○ | ○ | ○ | ○ | X | ○ | ○ |
| Throwing power in short-time electrodeposition | ○ | ○ | ○ | ○ | X | X | ○ | ○ |
| Zinc steel plate suitability | ○ | ○ | ○ | ○ | ○ | ○ | X | X |

From the results of the Examples, it has been confirmed that the coating method using a cationic electrodeposition coating composition according to the present invention provides a good suitability for zinc steel plate and a good throwing power in short-time electrodeposition.

What is claimed is:

1. An electrodeposition coating method comprising the steps of:
   (a) providing a lead-free cationic electrodeposition coating composition containing an aqueous medium, a binder resin dispersed or dissolved in the aqueous medium, a neutralizing acid, an organic solvent, and a metal catalyst, wherein
   the binder resin contains a sulfonium-modified epoxy resin having a milliequivalent number of sulfonium salt group per 100 g resin of 7 to 45, an amine-modified novolak epoxy resin having a molecular weight of 700 to 6000, an amine-modified bisphenol epoxy resin, and a blocked isocyanate curing agent,
   the lead-free cationic electrodeposition coating composition has a volatile organic content of 1% by weight or less,
   the lead-free cationic electrodeposition coating composition has a coating liquid conductivity of 1000 to 2500 μS/cm,
   said sulfonium-modified epoxy resin is obtained by allowing an epoxy resin to react with a sulfide compound represented by the following formula:

HO—R—S—R'—OH wherein R and R' are each independently a linear or branched alkylene group having 2 to 8 carbon atoms,
   the ratio by weight of said amine-modified bisphenol epoxy resin to said sulfonium-modified epoxy resin is within a range from 30/70 to 70/30, and
   a coated layer electrodeposited on an object to be coated has a minimum film-forming temperature of 20 to 35° C.;
   (b) adjusting the lead-free cationic electrodeposition coating composition to a temperature of from lower by 2° C. than the minimum film-forming temperature to higher by 6° C. than the minimum film-forming temperature;
   (c) immersing the object to be coated in the lead-free cationic electrodeposition coating composition; and
   (d) carrying out electrodeposition using the object to be coated as a cathode under the temperature of step b).

2. The method according to claim 1, wherein milliequivalent number of the neutralizing acid required for neutralizing 100 g of said amine-modified bisphenol epoxy resin is from 7 to 45.

3. The method according to claim 1, wherein said sulfide compound is 1-(2-hydroxyethylthio)-2-propanol.

4. The method according to claim 1, wherein said neutralizing acid is one or more kinds selected from the group consisting of acetic acid, lactic acid, formic acid, sulfamic acid, dimethylolpropionic acid, and methylol acid.

5. The method according to claim 1, wherein said amine-modified novolak epoxy resin is obtained by allowing primary amine and/or secondary amine to react with an epoxy resin represented by the following formula:

wherein R, R', and R" are each independently hydrogen or a linear or branched alkylene group having 1 to 5 carbon atoms, and the repetition unit number n is 0 to 25.

6. The method according to claim 1, wherein said lead-free cationic electrodeposition coating composition further contains a pigment, and the ratio by weight of the pigment contained in said lead-free cationic electrodeposition coating composition to solid resin components is 1/9 or less.

* * * * *